(12) United States Patent
Cawse et al.

(10) Patent No.: US 9,128,867 B2
(45) Date of Patent: Sep. 8, 2015

(54) CONFIGURABLE INTELLIGENT I/O EXPANDER SYSTEM

(71) Applicant: Geotab Inc., Oakville (CA)

(72) Inventors: Neil Charles Cawse, Oakville (CA); Darren Marc Lohmann Beams, Oakville (CA); Anthonios Partheniou, Burlington (CA); Thomas Arthur Walli, Hamilton (CA); Clive James Cawse, Oakville (CA); Victor Barreto, Oakville (CA)

(73) Assignee: Geotab Inc. (CA)

( * ) Notice: Subject to any disclaimer, the term of this patent is extended or adjusted under 35 U.S.C. 154(b) by 0 days.

(21) Appl. No.: 14/121,847

(22) Filed: Oct. 24, 2014

(65) Prior Publication Data
US 2015/0089084 A1 Mar. 26, 2015

Related U.S. Application Data

(62) Division of application No. 13/506,478, filed on Apr. 23, 2012, now Pat. No. 8,918,547.

(51) Int. Cl.
G06F 3/00 (2006.01)
G06F 13/10 (2006.01)
G06F 13/38 (2006.01)
H04Q 9/00 (2006.01)
H04L 12/46 (2006.01)

(52) U.S. Cl.
CPC ............ *G06F 13/102* (2013.01); *G06F 13/385* (2013.01); *H04L 12/4625* (2013.01); *H04Q 9/00* (2013.01); *H04Q 2209/40* (2013.01); *H04Q 2209/823* (2013.01); *H04Q 2209/883* (2013.01)

(58) Field of Classification Search
None
See application file for complete search history.

(56) References Cited

U.S. PATENT DOCUMENTS

| 7,647,433 | B2 | 1/2010 | Clark et al. |
| 2001/0016789 | A1 | 8/2001 | Staiger |
| 2004/0111195 | A1 | 6/2004 | Vries et al. |
| 2010/0131156 | A1 | 5/2010 | Lee |
| 2011/0255411 | A1 | 10/2011 | Isaac et al. |

FOREIGN PATENT DOCUMENTS

| DE | 10341514 | 4/2005 |
| EP | 1189393 | 3/2002 |

*Primary Examiner* — Idriss N Alrobaye
*Assistant Examiner* — Richard B Franklin
(74) *Attorney, Agent, or Firm* — Derek K. W. Smith

(57) ABSTRACT

A method and apparatus in a vehicular telemetry system for an intelligent I/O expander. The intelligent I/O expander may be configured in an active mode or a passive mode. A vehicular telemetry hardware system may be configured in a passive serial control mode or an active serial control mode. The intelligent I/O expander capable of adding additional device to the vehicular telemetry system.

20 Claims, 15 Drawing Sheets

US 9,128,867 B2

CONFIGURABLE INTELLIGENT I/O EXPANDER SYSTEM

This application Ser. No. 14/121,847 filed on Oct. 24, 2014 is a continuation application and claims the priority benefit of U.S. patent application Ser. No. 13/506,478 filed Apr. 23, 2012 and entitled "Configurable Intelligent I/O Expansion System".

TECHNICAL FIELD OF THE INVENTION

The present invention generally relates to a method and apparatus for application in vehicular telemetry systems. More specifically, the present invention relates to configurable intelligent I/O (input/output) expansion of peripheral devices and services.

BACKGROUND OF THE INVENTION

Vehicular Telemetry systems are known in the prior art.

United States published patent application 2004/0111191 to Jeroen et al is directed to a marine telematics system comprising a satcom unit on a boat, a user interface for the satcom unit, a web-based user interface for the telematics system, and a land-based center of operations. The land-based center of operations receives signals from the satcom unit on the boat about the location of the boat and sensor responses to detectable events. The marine telematics system is customizable through a web-based interface, allowing boat owners to provide information and instructions to the land-based center of operations for handling particular situations that may arise while the boat is in use or at dock. The web-based interface further allows boat owners to plan voyages by setting series of waypoints, and the land-based center of operations may assist the boat owners by providing feedback during their voyages based on the waypoint information previously provided by the boat owners. The marine telematics system of the invention allows users to remotely monitor the location of boats and events detected on boats, and to remotely activate equipment on boats.

United States published patent application 2001/0016789 to Staiger is directed to an electronic control system for controlling the function of a processing system, especially for the use in an automotive vehicle, wherein the control system comprises a plurality of logical control elements, each of which is especially adapted to perform special tasks, whereby each of the control elements is able to communicate with every other control element.

SUMMARY OF THE INVENTION

The present invention is directed to aspects in a vehicular telemetry system and provides a new capability for configurable intelligent I/O expansion of peripherals, devices, sensors, and services.

According to a first broad aspect of the invention, there is an apparatus for a configurable intelligent telematic I/O expander system. The system includes a messaging interface for connecting to a private bus, a configurable multi-device interface for connecting to a specific device, a microprocessor and memory for controlling said messaging interface and said configurable multi-device interface. The microprocessor and memory capable of sensing the configurable multi-device interface for self-configuring the I/O expander into one of a passive mode or an active mode.

According to a second broad aspect of the invention, there is an apparatus for a configurable intelligent telematic system. The system includes a vehicular telemetry hardware system. The vehicular telemetry hardware system including a first microprocessor and first memory capable of data logging and telecommunications, and an interface for connecting to a private bus. At least one configurable intelligent telematic I/O expander. The at least one configurable intelligent telematic I/O expander including a messaging interface for connecting to a private bus, a configurable multi-device interface for connecting to a specific device, a second microprocessor and second memory capable of sensing the configurable multi-device interface for self configuring the I/O expander into one of a passive mode or an active mode.

According to a third broad aspect of the invention, there is an apparatus for a configurable intelligent telematic system. The system including at least one server with application software, the server capable of communicating messages over a network, at least one computer communicating with the at least one server with application software, a vehicular telemetry hardware system. The vehicular telemetry hardware system including a first memory capable of data logging and telecommunications, and an interface for connecting to a private bus. At least one configurable intelligent telematic I/O expander including a messaging interface for connecting to a private bus, a configurable multi-device interface for connecting to a specific device, a second microprocessor and second memory capable of sensing the configurable multi-device interface for self configuring the I/O expander into a passive mode or an active mode.

According to a fourth broad aspect of the invention, there is a method of initializing an intelligent I/O expander and a vehicular telemetry hardware system. The method includes determine the I/O expander port type, if serial, set serial type and passive expander mode. If auxiliaries, set auxiliaries type and active expander mode. Send message and port type to vehicular telemetry hardware system. If serial, send query device message to I/O expander and receive device type. If device type is a first device type, set vehicular telemetry hardware system to active serial control mode. If device type is a second device type, set vehicular telemetry hardware system to passive serial control mode. If auxiliaries, send message with monitoring characteristics to I/O expander.

When the I/O expander is in a passive mode, the microprocessor and memory of the I/O expander capable of permitting data exchange between the messaging interface and the configurable multi-device interface, and when the I/O expander is in an active mode, the microprocessor and memory of the I/O expander capable of monitoring the configurable multi-device interface and capable of sending messages to the messaging interface upon detecting an event.

When the I/O expander is in a passive mode capable of sending a message to the messaging interface with an I/O expander ID and serial indication.

When the I/O expander is in a passive mode, capable of receiving a message from the messaging interface, converting the message, and sending a converted message to the configurable multi-device interface.

When the I/O expander is in a passive mode, capable of receiving a message from the configurable multi-device interface, converting the message, and sending a converted message to the messaging interface.

When the I/O expander is in a passive mode, capable of receiving an identify device message from the messaging interface, converting the identify device message, and sending a converted identify message to the configurable multi-device interface.

When the I/O expander is in a passive mode, capable of receiving a device identification message from the configurable multi-device interface, converting the device identification message, and sending a converted identification message to the messaging interface.

When the I/O expander is in an active mode, capable of receiving from the messaging interface the monitoring characteristics.

In an embodiment of the invention, the monitoring characteristics include threshold data, change data, and limit data for detecting an event.

In an embodiment of the invention, including a specific device for interfacing to the configurable multi-device interface and communication with the configurable intelligent I/O expander.

In an embodiment of the invention, the specific device is a serial device.

In an embodiment of the invention, the specific device is a satellite modem device.

In an embodiment of the invention, the specific device is a global positioning device (GPS).

In an embodiment of the invention, the specific device is auxiliaries. The auxiliaries may be sensors.

In an embodiment of the invention, the interface for connecting to a private bus is a gateway. In another embodiment of the invention, the interface connecting to a private bus is a common messaging interface.

In an embodiment of the invention, the interface for connecting to a private bus is a messaging interface, the private bus interfaces to the messaging interface of the vehicular telemetry hardware system and to the messaging interface of at least one configurable intelligent I/O expander.

In an embodiment of the invention, the active mode capable of receiving from the vehicular telemetry hardware system over the private bus the monitoring characteristics.

In an embodiment of the invention, further including a specific device for interfacing to the configurable multi-device interface of each of the at least one configurable intelligent I/O expander for communication over a multi-device bus between the specific device and the configurable multi-device interface.

In an embodiment of the invention, the microprocessor and memory of the vehicular telemetry hardware system configured with logic to command and control the satellite modem device.

In an embodiment of the invention, the microprocessor and memory of the vehicular telemetry hardware system configured to pass messages with the global positioning device.

In an embodiment of the invention, at least one of the configurable intelligent I/O expander is configured in a passive mode and the specific device is a global positioning device.

In an embodiment of the invention, at least one of the configurable intelligent I/O expander is configured in a passive mode and the specific device is a satellite modem device.

In an embodiment of the invention, at least one of the configurable intelligent I/O expander is configured in an active mode and the specific device is auxiliaries. The auxiliaries may be AUX 1-4. The auxiliaries may be AUX 5-8.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematic Communication System

Figure 1:
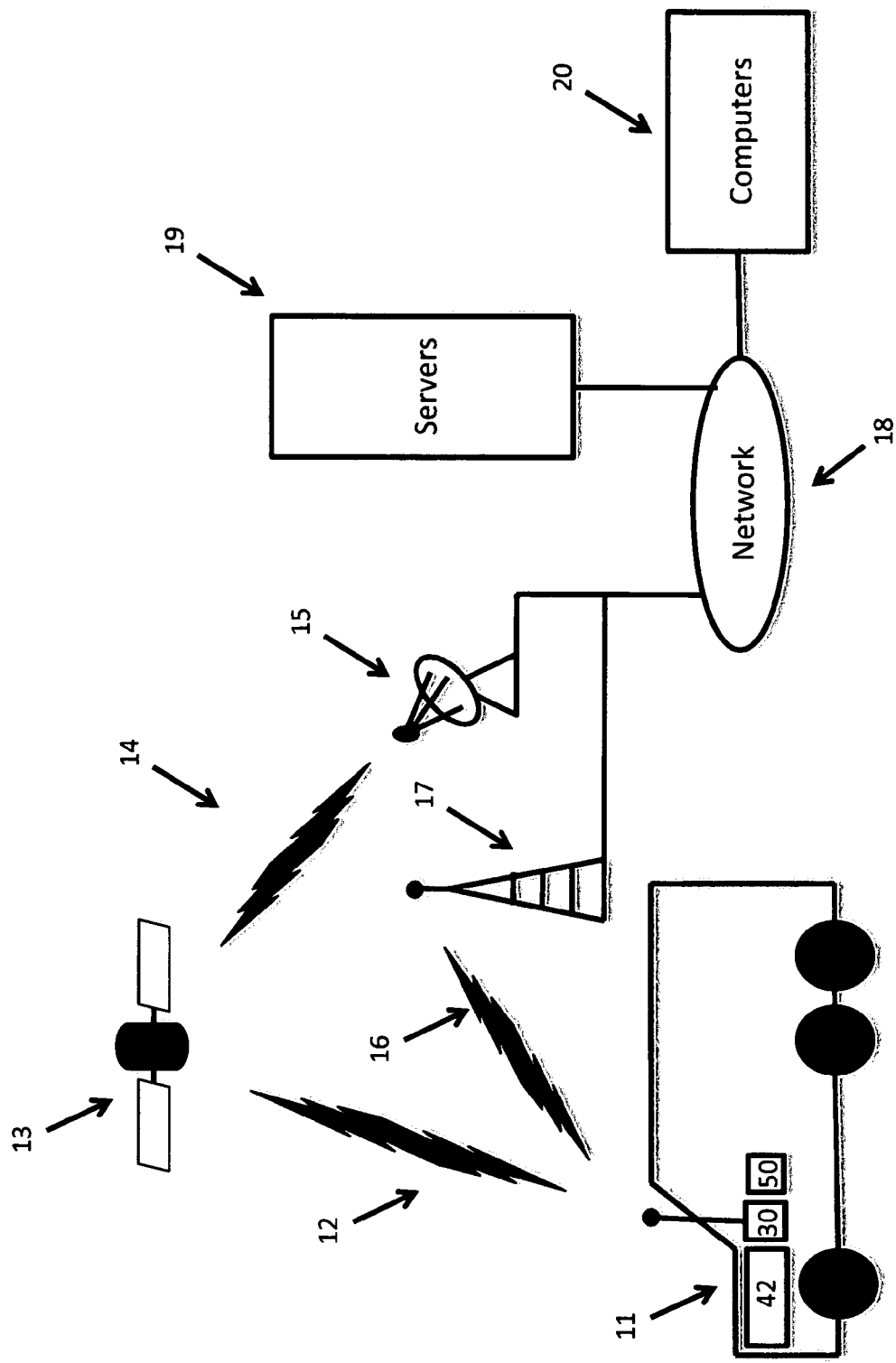
FIG. 1 is a high level diagrammatic view of a vehicular telemetry communication system.

Referring to FIG. 1 of the drawings, there is illustrated a high level overview of a telematic communication system. There is at least one vehicle generally indicated at 11. The vehicle 11 includes a vehicular telemetry hardware system 30 and a resident vehicular portion 42. Connected to the telemetry hardware system 30 is at least one intelligent I/O expander 50.

The telematic communication system provides communication and exchange of data, information, commands, and messages between the servers 19, computers 20, and vehicles 11. In one example, the communication 12 is to/from a satellite 13. The satellite 13 in turn communicates with a ground-based system 15 connected to a computer network 18. In another example, the communication 16 is to/from a cellular network 17 connected to the computer network 18. In an embodiment of the invention, communication 16 to/from the cellular network 17 is facilitated by the vehicular telemetry hardware system 30. In another embodiment of the invention, an intelligent I/O expander 50 facilitates communication 12 to/from the satellite 13. Further examples of communication devices include WiFi devices and BlueTooth devices.

Computer 20 and server 19 with application software communicate over the computer network 18. In an embodiment of the invention, the Checkmate™ telematic application software runs on a server 19. Clients operating a computer 20 communicate with the Checkmate™ application software running on the server 19. Data, information, and commands may be sent and received over the telemetic communication system between the vehicular telemetry hardware system 30, intelligent I/O expander 50, and the server 19. While the diagram illustrates s single server 19 and computer 20, the invention may include a plurality of servers 19 and computers 20 accessing the network 18.

In an embodiment of the invention, data and information may be sent from the vehicular telemetry hardware system 30 to the cellular network 17, to the computer network 18, and to the servers 19. Computers 20 may access the data and information on the servers 19. Alternatively, data, information, and commands may be sent from the servers 19, to the network 19, to the cellular network 17, and to the vehicular telemetry hardware system 30.

In another embodiment of the invention, data and information may be sent from vehicular telemetry hardware system to an intelligent I/O expander 50, to an Iridum™ device, the satellite 13, the ground based station 15, the computer network 18, and to the servers 19. Computers 20 may access data and information on the servers 19. In another embodiment of the invention, data, information, and commands may be sent from the servers 19, to the computer network 18, the ground based station 15, the satellite 13, an Iridum™ device, to an intelligent I/O expander 50, and to a vehicular telemetry hardware system.

Vehicular Telemetry Hardware System

Figure 2:
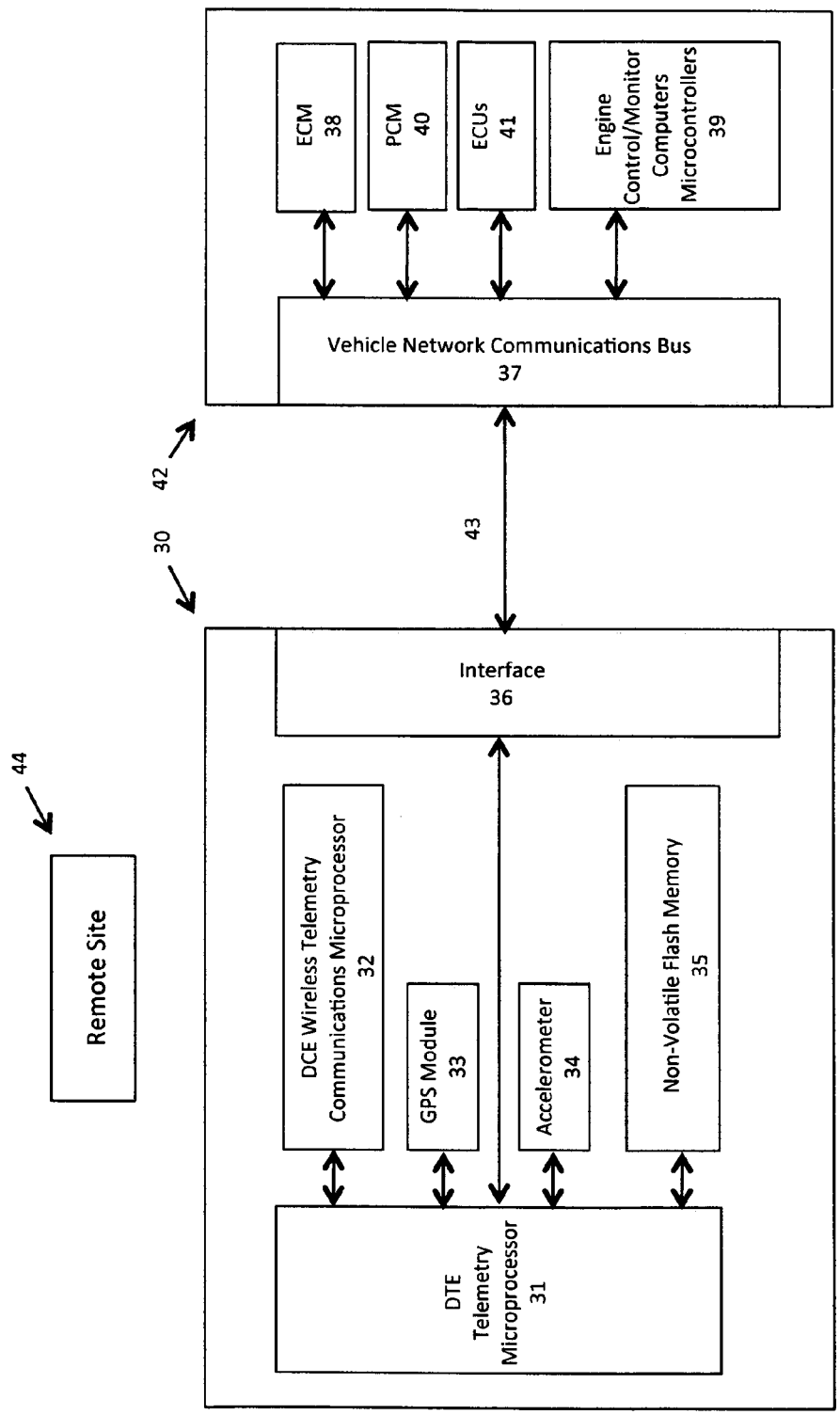
FIG. 2 is diagrammatic view of an vehicular telemetry hardware system including an on-board portion and a resident vehicular portion.

Referring now to FIG. 2 of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile flash memory 35; and provision for an OBD (on board diagnostics) interface 36 for connection 43 and communicating with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that the present invention could be a complete resident vehicular system or a complete on-board system.

The DTE telemetry microprocessor is interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident vehicular system components for further processing.

As a brief non-limiting example of vehicle data and information, the list may include: VIN (vehicle identification number), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote site 44. A remote site 44 could be another vehicle or a ground based station. The ground-based station may include one or more servers 19 connected through a computer network 18 (see FIG. 1). In addition, the ground-based station may include computer application software for data acquisition, analysis, and sending/receiving commands to/from the vehicular telemetry hardware system 30.

The DTE telemetry microprocessor 31 is also interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30.

The DTE telemetry microprocessor 31 is further interconnected with an external non-volatile flash memory 35. In an embodiment of the invention, an example of the flash memory 35 is a 32 MB non-volatile flash memory store commercially available from Atmel Corporation. The flash memory 35 of the present invention is used for data logging.

The DTE telemetry microprocessor 31 is further interconnected for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full scale range of +−2 g and +−8 g, programmable thresholds, and is capable of measuring accelerations with an output data rate of 100 Hz or 400 Hz.

In an embodiment of the invention, the DTE telemetry microprocessor 31 also includes an amount of internal flash memory for storing firmware that executes in part, the method of the present invention as well as other methods to operate and control the overall system. In addition, the microprocessor 31 and firmware log data, format messages, receive messages, and convert or reformat messages. In an embodiment of the invention, an example of a DTE telemetry microprocessor 31 is a PIC24H microcontroller commercially available from Microchip Corporation.

The vehicular telemetry hardware system 30 receives data and information from the resident vehicular portion 42, the GPS module 33, the accelerometer 43, and from configured intelligent I/O expanders 50. The data and information is stored in non-volatile flash memory 35 as a data log. The data log may be further transmitted by the vehicular telemetry hardware system 30 over the vehicular telemetry communication system to the server 19 (see FIG. 1). The transmission may be controlled and set by the vehicular telemetry hardware system 30 at pre-defined intervals. The transmission may also be triggered as a result of a significant event such as an accident. The transmission may further be requested by a command sent from the application software running on the server 19.

Intelligent I/O Expander Hardware System

Figure 3:
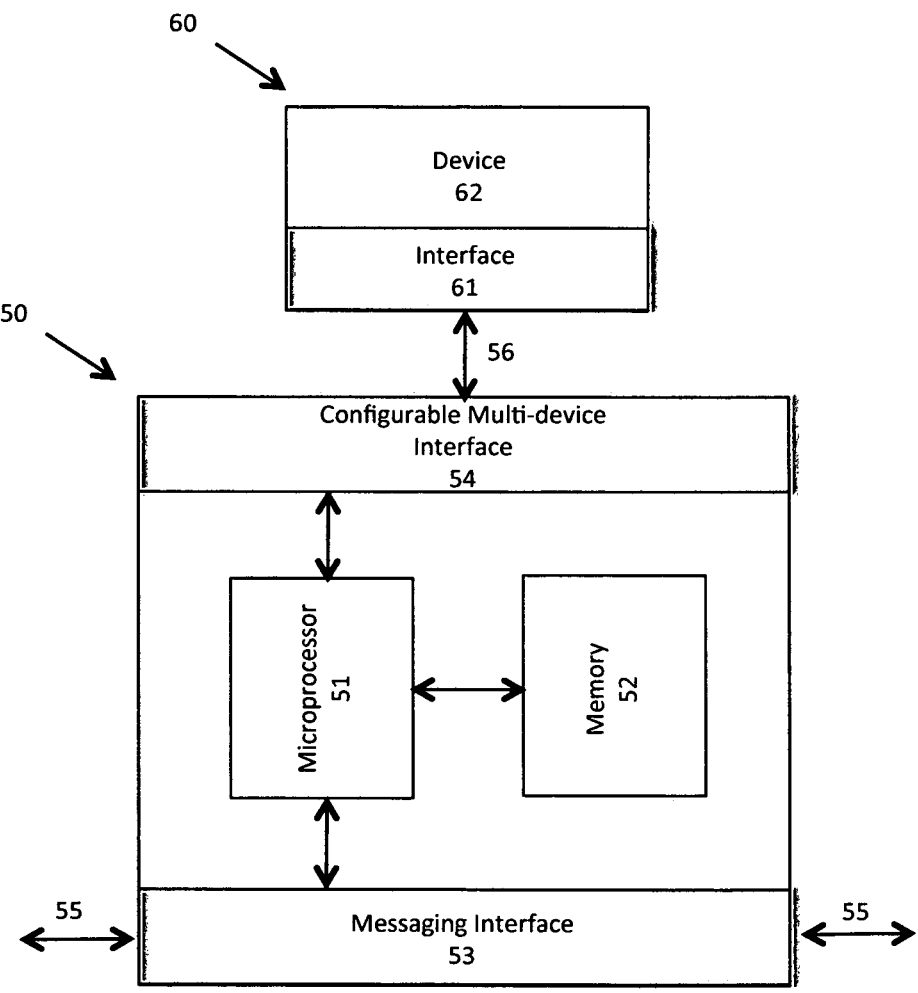
FIG. 3 is a diagrammatic view of an intelligent I/O hardware expander.

Referring now to FIG. 3 of the drawings, there is illustrated an intelligent I/O expander generally indicated at 50.

The intelligent I/O expander 50 includes a messaging interface 53 for a connection to a private bus 55 (in an embodiment of the invention, the private bus 55 is a cable connection, or private cable). The private bus 55 provides for connection to other intelligent I/O expanders (see FIG. 5) as well as the vehicular telemetry hardware system 30 (see FIG. 4). In an embodiment of the invention, the messaging interface 53 and private bus 55 is based upon a CAN bus. The messaging interface 53 includes five conductors. There are two power conductors (12-24 volts), a ground conductor, a CAN High conductor, and a CAN Low conductor.

Messaging on the private bus 55 is based upon a frame consisting of and ID and a varying number of data bytes. The ID portion may be 11 bits or 29 bits and the data may be zero to eight bytes of data. Messages may be sent over the private bus 55 when the bus is idle. The vehicular telemetry hardware system 30 and all intelligent I/O expanders 50 connected to the private bus 55 see all messages by monitoring the private bus 55. A message may be received by either the vehicular telemetry hardware system 30, or a particular intelligent I/O expander 50 based upon the ID contained in the frame. If the ID matches the particular device, then the device receives the message. The data portion of a message may contain data, information, or device commands.

In addition, the intelligent I/O expander 50 includes an configurable multi-device interface 54. The configurable multi-device interface 54 provides for connection to a multi-device bus 56 (in an embodiment of the invention, the multi-device bus 56 is a GeoTab™ intelligent configuring cable connection). The multi-device bus 56 in turn provides connection to an interface 61 of a specific device 60. In an embodiment of the invention, the configurable multi-device interface 54 includes thirteen conductors. There are six conductors for bidirectional serial communication that include a data set ready (DSR) conductor, a clear to send (CTS) conductor, a transmit data conductor (TX), a data terminal ready (DTR) conductor, a request to send (RTS) conductor, and a receive data (RX) conductor. This grouping of conductors is for connecting to a first type of device, a device that requires serial communication. There are also four conductors, AUX1, AUX2, AUX3 and AUX4 for connecting auxiliary devices. This grouping of conductors is for connecting a second type of device (non-serial communication device). Finally, there are two ground conductors and one power conductor (12V). The conductors in association with a GeoTab™ intelligent configuring cable are also used to establish the type of connection as a serial type or an auxiliaries type and identification of either AUX 1-4, or AUX 5-8.

The intelligent I/O expander hardware system 50 also includes a microprocessor 51 and memory 52. The microprocessor 51 is also connected to the messaging interface 53 and the configurable multi-device interface 54. In an embodiment of the invention, the microprocessor 51 is an LPC1756 32 bit ARM Cortec-M3 device with up to 512 kB of flash program memory and 64 kB SRAM. The LPC1756 also includes four UARTs, two CAN 2.0B channels, a 12 bit analog to digital converter, and a 10 bit digital to analog converter.

The microprocessor 51, CAN 2.0B controller, and firmware computer program stored in the flash program memory communicate with the messaging interface 53. The messaging interface 53 and private bus 55 may be monitored by the Can 2.0B controller to send a message, ignore a sent message, or receive a message. For example, a message may be received by an intelligent I/O expander 56 when the message ID matches the expander ID.

The intelligent I/O expander 50 may be operated as a serial type in a passive expander mode or as an auxiliaries type in an active expander mode based upon an established configuration of the device.

Passive Expander Mode

A message received by the intelligent I/O expander 50 over the private bus 55 is converted or reformatted and sent from the intelligent I/O expander 50 to a first type of device connected to the configurable multi-device interface 54. This is accomplished by the microprocessor 51 and firmware computer program. This is a protocol conversion from the format and structure of the message on the private bus 55 to the requirements of a specific device connected by the multi-device bus 56.

Alternatively, a message received by the intelligent I/O expander 50 from a first type of device connected to the configurable multi-device interface 54 is converted or reformatted by the microprocessor 51 and firmware computer program, provided to the messaging interface 53, and sent over the private bus 55. This is a protocol conversion from the format and structure of the message for the requirements of the specific device 60 to the format and structure required by the private bus 55.

In the passive expander mode, the data portion of the message is passed through the intelligent I/O expander 50. The data could be passed through from the messaging interface 53 to the configurable multi-device interface 54, or from the configurable multi-device interface 54 to the messaging interface 53. The intelligent I/O expander 50 does not have any logic or control over a device 60, it performs a protocol conversion between interfaces. An example protocol conversion is from a CAN bus (private bus 55) to a serial bus (multi-device bus 56).

Active Expander Mode

In addition to the passive expander mode for the first type of device and serial communication with the intelligent I/O expander 50, there is also an active expander mode for a second type of device (auxiliaries type) and non-serial communication. The microprocessor 51 and firmware computer program monitor the configurable multi-device interface 54 and auxiliaries connected to the configurable multi-device interface 54. Data and information may be buffered in memory 52. The intelligent I/O expander 50 has logic and monitoring capability over the device 60 (auxiliaries). When certain monitoring characteristics are met, the data and information may be formatted into a frame and a message containing the data may be sent over the private bus 55 to the vehicular telemetry hardware system 30. Alternatively, the frame and message may be sent to another intelligent I/O expander 50.

Devices

A number of difference specific devices 60 may be interfaced to the intelligent I/O expander 50. The configurable multi-device interface 54 may accommodate a number of different devices 62 and interfaces 61 through the configurable multi-device interface 54 and multi-device bus 56. When a specific device 60 is connected to the intelligent I/O expander 50, messages, data, or signals may be communicated between the device 62 and the intelligent I/O expander 50.

For example, if the specific device 60 is a Garmin™ type of GPS device 62 with the fleet management interface (FMI15 or FMI 45), the interface 61 to the Garmin™ device may be connected to the configurable multi-device interface 54 for communication with the intelligent I/O expander 50. In this case, the configurable multi-device interface has one end and configuration to the configurable multi-device interface 54 and a second end and configuration to the interface 61, in this example, a Garmin™ interface. A GeoTab™ intelligent configuring cable provides a mapping of conductors between the interfaces.

The DTE telemetry microprocessor 31 and firmware computer program of the vehicular telemetry hardware system 30 includes the logic, commands, and protocol instructions for communicating with a Garmin™ device 62 for detecting the presence of the device. Otherwise, messages received by the vehicular telemetry hardware system 30 for a Garmin™ device are sent on the private bus 55 to an intelligent I/O expander that in turn converts or reformats the message and sends it to the Garmin™ device. The Garmin™ device is an example where the vehicular telemetry hardware system 30 is in a passive control mode. Aside from very basic logic, commands, and protocol instructions, the firmware does not have a full and complete set of logic and commands for the device. In this case, the full and complete set of logic and commands for the device resides in the Checkmate™ application software on the server 19. Initialization of the intelligent I/O expander 50 and the vehicular telemetry hardware system 30 associate the intelligent I/O expander with the passive expander mode and the vehicular telemetry hardware system 30 with the passive control mode and device type.

As another example, if the specific device 60 is an Iridium™ type of satellite communications device 62, the interface 61 to the Iridium™ device 62 may also be interfaced to the configurable multi-device interface 54 by the multi-device bus 56 for communication with the intelligent I/O expander 50. In an embodiment of the invention, an Iridium™ 9602SBD may be connected to the intelligent I/O expander 50. The Iridium™ 9602SBD is a short burst data modem, or transceiver module designed for machine-to-machine solutions for sending and receiving packets of data. The interface includes a serial data interface, DC power input, network available output, and power on/off control line. In this case, the GeoTab™ configurable multi-device cable 56 has one end and configuration to the configurable multi-device interface 54 and a second end and configuration to the interface 61, in this example, an Iridium™ interface.

The DTE telemetry microprocessor 31 and firmware computer program of the vehicular telemetry hardware system 30 includes the logic, commands, and protocol instructions for communicating with the Iridium™ device in order to send and receive messages (data and information) as well as control of the device. Example non-limiting commands include acquiring the satellite, authenticating the transceiver, sending messages, receiving messages, exchanging status information, and performing modem control. The firmware has a full and complete set of logic and commands for the device. This is an example where the vehicular telemetry hardware system 30 is in an active control mode. Initialization of the intelligent I/O expander and the vehicular telemetry hardware system 30 associate the intelligent I/O expander 50 with the passive expander mode and the vehicular telemetry hardware system 30 with the active control mode and device type.

Both the Garmin™ and Iridium™ devices are examples of a first type of device that requires serial communication for sending and receiving messages and device data. The server 19 and Checkmate™ application program contain the logic and instructions for operating with a Garmin™ device. The DTE telemetry microprocessor 31 and firmware computer program of the vehicular telemetry hardware system 30 contain the logic and instructions for operating with the Iridium™ device. For example, the Checkmate™ application program may create and send a command to a Garmin™ device. In this example, the message (including the command in the data) is provided to the vehicular telemetry hardware system 30 that converts or reformats the message to the private bus 55. An intelligent I/O expander 50 receives the message, converts or reformats the message to the multi-device bus 56 where the Garmin™ device receives the command. As another example, the vehicular telemetry hardware system 30 may create and send a command to an Iridium™ device. In this example a message (including the command in the data) is provided to the private bus 55. An intelligent I/O expander 50 receives the message, converts or reformats the message to the multi-device bus 56 where the Iridium™ device receives the command.

As another example, the device 62 could be a series of temperature sensors that include an interface 61 and connected to the configurable multi-device interface 54 by another multi-device bus 56. This is an example of a second type of device, or non-serial communication device wherein the intelligent I/O expander 50 monitors the second type of device. The microprocessor 51 and firmware computer program of the intelligent I/O expander 50 contain the logic and instructions for monitoring and logging data with the auxiliaries. The server 19 and Checkmate™ application program contain the logic and instructions for interpreting the logged data from the auxiliaries. The Checkmate™ application program also contains an identification and mapping of each auxiliary device interfaced to the configurable multi-device interface 54 (Aux 1-4, Aux 5-8).

Persons skilled in the art will appreciate the invention may also include many other specific devices 60 for connection to the configurable multi-device interface 54. For example, GeoTab™ specific devices, $3^{rd}$ party devices, additional vehicular sensors, cell phones, computers, analog I/O, digital I/O, driver identification, WiFi, 900 Mhz Aerocomm, and Bluetooth devices.

Figure 4:
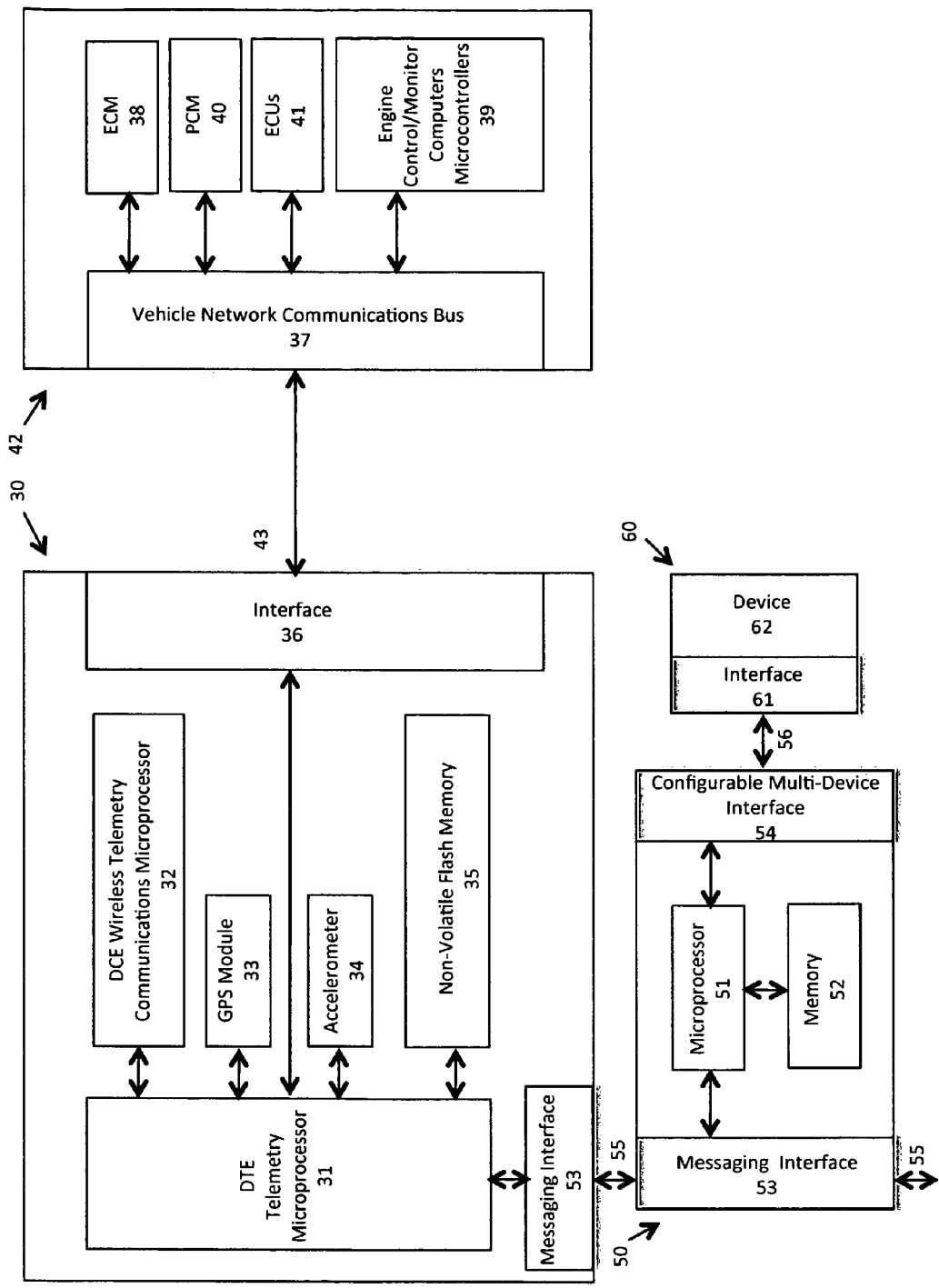
FIG. 4 is a diagrammatic view of an embodiment of the invention illustrating a vehicular telemetry hardware system directly interconnected to a first intelligent I/O expander.

Referring now to FIG. 4, an embodiment of the invention is further described. In this embodiment, the vehicular telemetry hardware system 30 includes a messaging interface 53. The messaging interface 53 is connected to the DTE telemetry microprocessor 31. In addition, a messaging interface 53 in an intelligent I/O expander 50 may be connected by the private bus 55. The private bus 55 permits messages to be sent and received between the vehicular telemetry hardware system 30 and the intelligent I/O expander, or a plurality of I/O expanders (see FIG. 5).

Figure 6:
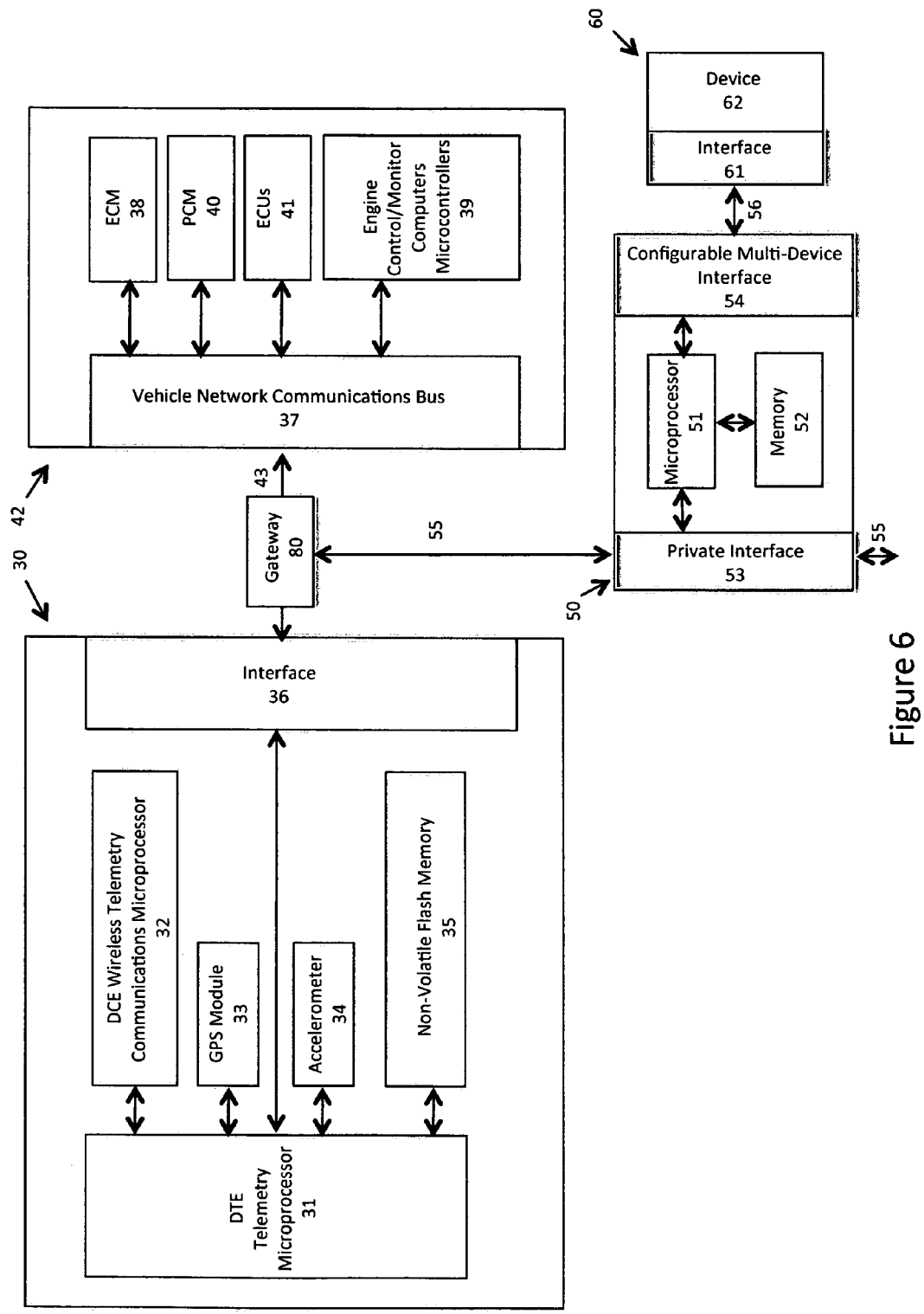
FIG. 6 is a diagrammatic view of an alternate embodiment of the invention illustrating a vehicular telemetry hardware system indirectly interconnected to a first intelligent I/O expander through a gateway.

Referring now to FIG. 6, an alternate embodiment of the invention is described. In this embodiment, the vehicular telemetry hardware system 30 is connected to the intelligent I/O expander through a gateway 80 on the vehicle connection 43. The vehicle connection 43 is a CAN bus providing communication between the vehicular telemetry hardware system 30 and the resident vehicular portion 42. The gateway 80 passes messages from the resident vehicular portion 42 to the vehicular telemetry hardware system 30, but does not allow messages from the vehicular telemetry hardware system 30 to be sent to the resident vehicular portion 42. However, the DTE telemetry microprocessor 31 is connected to the interface 36, the vehicle connection 43 and the gateway 80. The gateway monitors the vehicle connection 43 and permits messages to be sent from the DTE telemetry microprocessor 31 to the intelligent I/O expander over the private bus 55. In addition, the intelligent I/O expander may send messages over the private bus 55 to the gateway 80 and the gateway may pass the messages to the DTE telemetry microprocessor 31 by the vehicle connection 43 and the interface 36. The gateway 80 will not allow messages to be sent from the intelligent I/O expander 50 to the vehicle network communication bus 37 over the vehicle connection 43.

Figure 5:
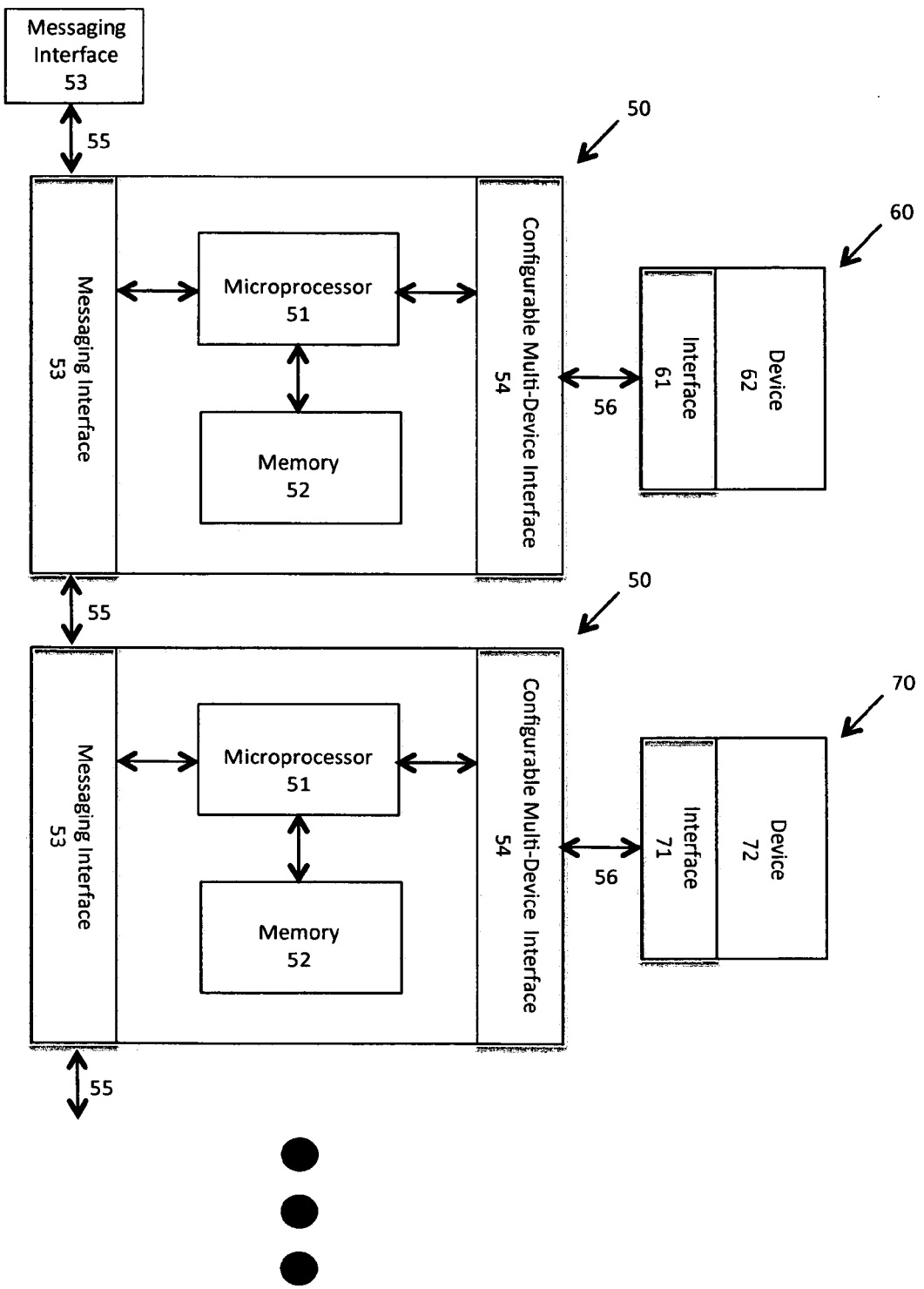
FIG. 5 is a diagrammatic view of a series of interconnected intelligent I/O hardware expanders.

Referring now to FIG. 5, multiple intelligent I/O expanders may be connected in a sequence and structure to each other. The private bus 55 is common to all intelligent I/O expanders and the vehicular telemetry hardware system 30. In addition, the vehicular telemetry hardware system 30 and each intelligent I/O expander 50 have the messaging interface 53. This permits a daisy chain like connection between the components for sending and receiving messages over the private bus 55. In an embodiment of the invention, up to eight intelligent I/O expanders may be connected to a vehicular telemetry hardware system. In another embodiment of the invention, up to two of the intelligent I/O expanders may be auxiliaries (AUX 1-4 and AUX 5-8). Optionally, the last intelligent I/O expander in the series may include a terminator connected to the last messaging interface 53 for noise suppression.

Method

The DTE telemetry microprocessor 31, firmware computer program, and memory 35 include the instructions, logic, and control to execute the portions of the method that relate to the vehicular telemetry hardware system 30. The microprocessor 51, firmware computer program, and memory 52 include the instructions, logic and control to execute the portions of the method that relate to the intelligent I/O expander 50.

Figure 7:
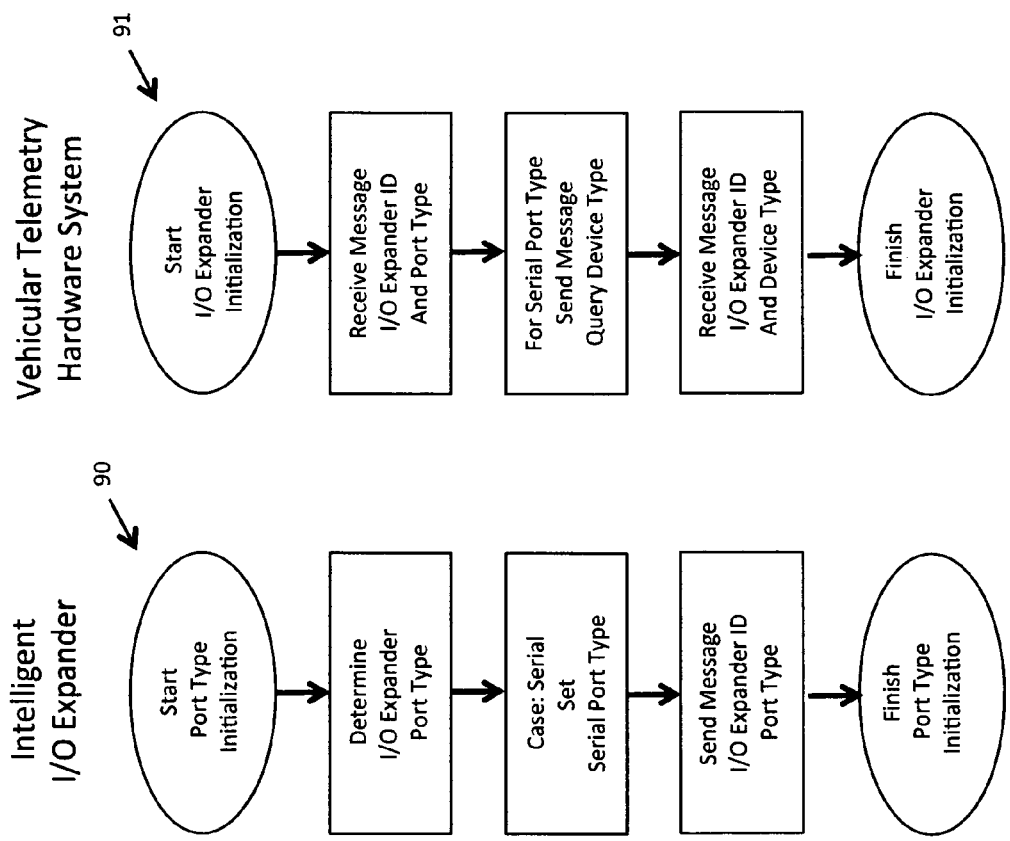
FIG. 7 is a high level flowchart for initialization of an intelligent I/O expander and a vehicular telemetry hardware system for the case of an I/O expander configured as a serial port type.

Referring now to FIG. 7, an initialization method of the intelligent I/O expander 50 and the vehicular telemetry hardware system 30 is described with respect to a first case (serial port type detected). The initialization for the intelligent I/O expander 50 is generally indicated at 90.

The initialization method 90 starts with determining the I/O expander port type (either serial port type or auxiliaries port type). In an embodiment of the invention, if there is no short between the RX and TX conductors, and there is no short between the CTS and RTS conductors, then the port is determined to be a serial port type. This is accomplished by the firmware sensing the conductors in the configurable multi-device interface 54 and checking for shorted conductors. For this case, set the port type to serial and set the state or mode to passive expander mode. Send a message over the private bus 55 to the vehicular telemetry hardware system ID with the I/O expander ID and an indication that the port type is serial. This message will be received by the vehicular telemetry hardware system 30. This informs the vehicular telemetry hardware system 30 that an intelligent I/O expander with a particular ID number is configured as a serial port type in a passive expander mode.

The initialization method for the vehicular telemetry hardware system 30 is generally indicated at 91. This initialization method 91 receives a message from the I/O expander 50 over the private bus 55. The message includes an I/O expander ID and an indication to the port type, in this first case a serial port type in a passive expander mode. The vehicular telemetry hardware system 30 sends a message to the I/O expander ID that will query the device type connected to the intelligent I/O expander 50. The intelligent I/O expander 50 will convert or reformat the message received on the private bus 55 and pass the message to the device 62 over the multi-device bus 56. The device 62 will identify itself and send back a message to the intelligent I/O expander 50 over the multi-device bus 56. The intelligent I/O expander 50 in turn will convert or reformat this message and send the message over the private bus 55. The vehicular telemetry hardware system 30 will receive the message with the I/O expander ID and the device type.

The query of the device type may occur in a number of different ways. For example, if the vehicular telemetry hardwire system is looking to determine if a Garmin™ device 62 is connected to an intelligent I/O expander 50, then the message to the intelligent I/O expander 50 is based upon the Garmin™ protocol to detect the presence of a Garmin™ device. If a Garmin™ device is connected, then the Garmin™ device will send back a message indicating a Garmin™ device is present. If a Garmin™ device is not present, there will not be any message sent back and a time out will occur. Assuming a Garmin™ device is detected, then the vehicular telemetry hardware system 30 is set to a passive control mode. The Garmin™ device is an example of a passive control device and persons skilled in the art will appreciate that other types of devices may also be included in the passive control mode.

As another example, if the vehicular telemetry hardware system is looking to determine if an Iridium™ device 62 is connected to an intelligent I/O expander 40, then the message is based upon the Iridium™ modem protocol to detect the present of an Iridium™ device. If an Iridium™ device is connected, the Iridium™ device will send back a message indicating an Iridium device is present. If an Iridium™ device is not present, there will not be any message sent back and a time out will occur. Assuming an Iridium™ device is detected, and then the vehicular telemetry hardware system 30 is set to an active control mode. The Iridium™ device is an example of an active control device and persons skilled in the art will appreciate that other types of devices may also be included in the active control mode.

The method for the vehicular telemetry hardware system 30 continues through a list of potential serial devices until the list has been completed. The vehicular telemetry hardware system 30 may also periodically check for additional intelligent I/O expanders 50 to ensure expanders later added are identified and configured.

In addition, while the vehicular telemetry hardware system firmware may contain the necessary instructions, logic and protocol for serial devices like Garmin™ and Iridium™, additional instructions, logic, and protocols may be provided to the firmware, or received by the vehicular telemetry hardware system 30 in real time by sending from the server 19 the associated logic and firmware for storage in the flash memory 35 of the vehicular telemetry hardware system 30.

Figure 9:
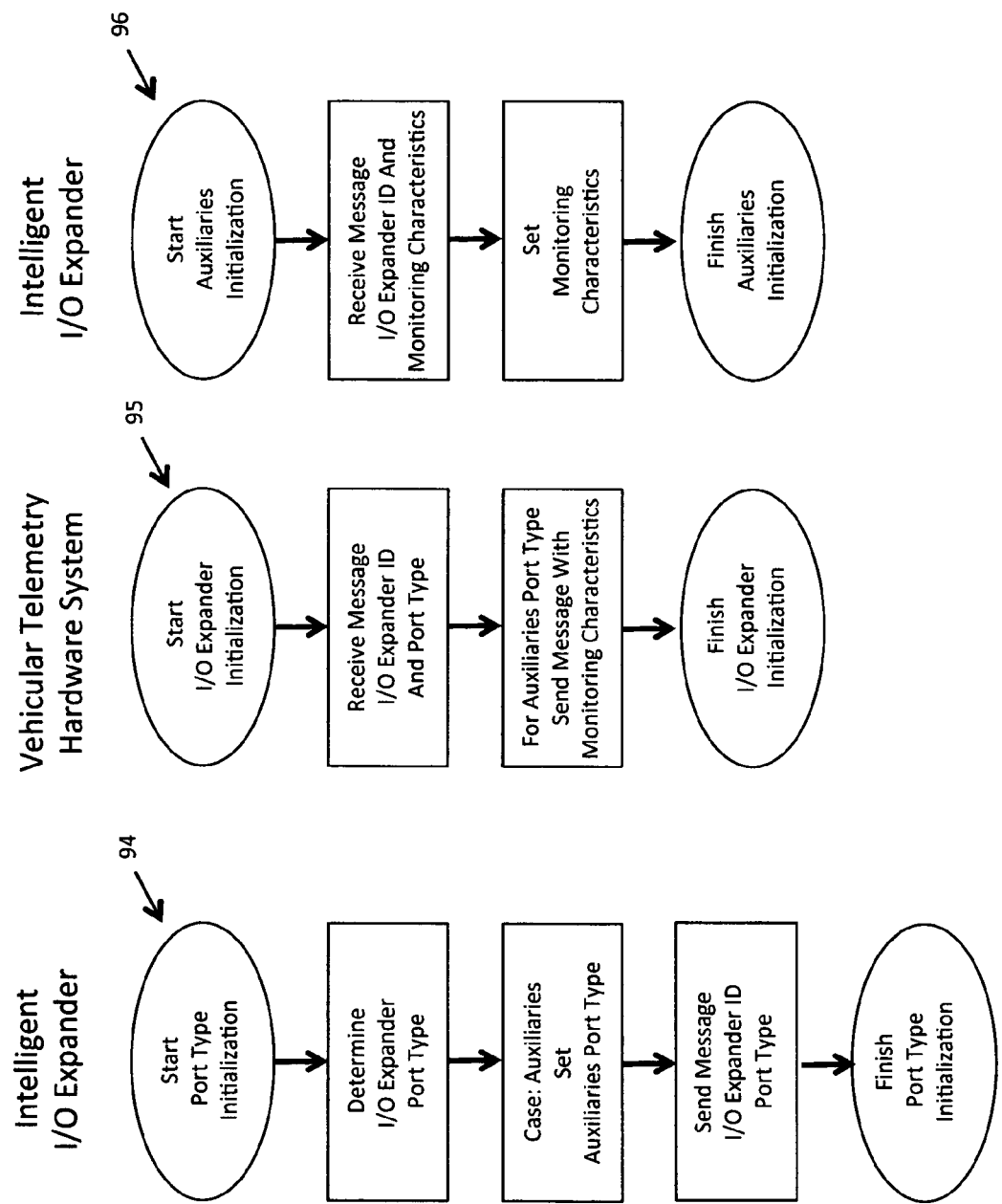
FIG. 9 is a high level flow chart for initialization of an intelligent I/O expander and a vehicular telemetry hardware system for the case of an I/O expander configured as an auxiliaries port type and active expander mode.

Referring now to FIG. 9, the initialization method of the intelligent I/O expander 50 and the vehicular telemetry hardware system 30 is further described with respect to a second case. The second case initialization for the intelligent I/O expander 50 is generally indicated at 94.

The initialization method 94 starts with determining the I/O expander port type (either serial or auxiliaries). In an embodiment of the invention, if there is a short between the RX and TX conductors, then aux 1-4 has been detected. In an embodiment of the invention, if there is a short between the CTS conductor and the RTS conductor, then aux 5-8 has been detected. The microprocessor 51 and firmware computer program in the intelligent I/O expander 50 sense the conductors and determine if there is a short between conductors. This provides for detecting the configuration of the port as either AUX 1-4 or AUX 5-8 to the vehicular telemetry hardware system ID. For this case, set the port type to aux 1-4 or aux 5-8 and set the state or mode to active expander mode. Send a message over the private bus 55 with the I/O expander ID and indicate the port type as either aux 1-4 or aux 5-8. This message will be received by the vehicular telemetry hardware system 30. This informs the vehicular telemetry hardware system 30 that an intelligent I/O expander with a particular ID number is configured as an auxiliaries device and AUX 1-4 or AUX 5-8.

The initialization method for the second case of the vehicular telemetry hardware system 30 is generally indicated at 95. This initialization method 95 receives a message from the I/O expander 50 over the private bus 55. The message includes an I/O expander ID and an indication to the port type as either aux 1-4 or aux 5-8. Since this is recognized as an active expander mode, The vehicular telemetry hardware system 30 sends a message to the I/O expander ID that includes monitoring characteristics for the intelligent I/O expander 50.

The intelligent I/O expander 50 receives the message from the vehicular telemetry hardware system 30 over the private bus 55 and starts the auxiliaries initialization generally indicated at 96. The message includes the I/O expander ID and the specific monitoring characteristics for the intelligent I/O expander 50. The intelligent I/O expander 50 then sets the monitoring characteristics for the auxiliaries connected to the configurable multi-device interface 54. Monitoring characteristics are not limited to but may include thresholds and changes in values.

The vehicular telemetry hardware system 30 and each intelligent I/O expander 50 connected to the system complete the initialization methods previously described with reference to FIG. 7 and FIG. 9 to determine what devices are connected to what intelligent I/O expanders 50, to set the I/O expander mode (passive or active), and to set the vehicular telemetry hardware system mode (active control or passive control), and to associate IDs in the system.

In an embodiment of the invention, there is a cabling technique for connecting each device 62 and interface 61 to the configurable multi-device interface 54. For the case with serial devices, the conductors required for serial communication at the configurable multi-device interface 54 are mapped by a GeoTab™ intelligent configuring cable and provided to the interface 61. This may vary from specific device 60 to specific device 60. This also provides an interfacing capability, for example between and intelligent I/O expander 50 and a Garmin™ device, or an intelligent I/O expander 50 and an Iridium™ device.

In addition, the cabling technique also identifies the port type of serial or auxiliaries (AUX 1-4, AUX 5-8). For example, if the Geotab™ intelligent configuring cable internally shorts the RX and TX conductors of the serial interface conductors, then AUX 1-4 is established on the AUX conductors. As another example, if the Geotab™ intelligent configuring cable internally shorts the CTS and the RTS conductors of the serial interface conductors, then an AUX 5-8 is established on the AUX conductors. Persons skilled in the art will appreciate that other techniques may be applied to identify the port type of serial or auxiliaries (AUX 1-4 and AUX 5-8).

Figure 8:
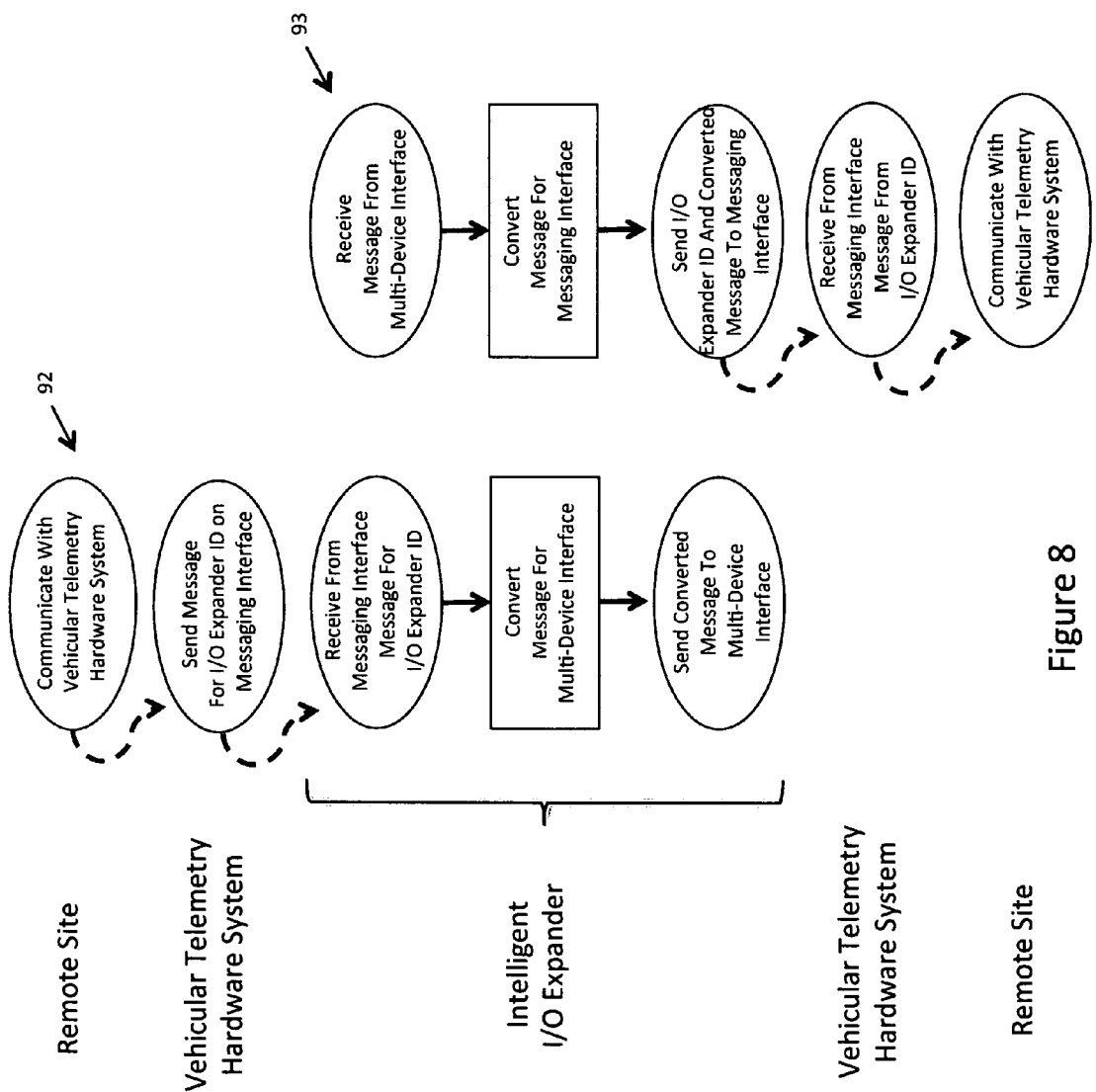
FIG. 8 is a high level flowchart for communication within the system for the case of an I/O expander configured as a serial port type.

The method and operation of the intelligent I/O expander 50 for the case of a serial port type is now described with reference to FIG. 8. Communication to a device attached to an intelligent I/O expander 50 is generally indicated at 92. Communication may either begin at a remote site (server 19) where a message is sent to the vehicular telemetry hardware system 30 that in turn is received by the vehicular telemetry hardware system 30. Alternatively, a message may be generated by the vehicular telemetry hardware system 30. The vehicular telemetry hardware system 30 may send a message to an intelligent I/O expander 50 with an I/O expander ID and message on the private bus 55 through the messaging interface 53. The intelligent I/O expander 50 receives the message (ID's match) from the messaging interface 53 including the I/O expander ID and message. The intelligent I/O expander converts or reformats the message for the device associated with the configurable multi-device interface 54 and sends the message to the multi-device interface 54. A specific device 60 (for example Garmin™ or Iridium™) receives the message through the interface 61.

Communication from a specific device 60 connected to an intelligent I/O expander 50 is generally indicated at 93. Communication may also begin with the specific device 60. A specific device 60 may send a message to the intelligent I/O expander 50 on the multi-device bus 56 and to the configurable multi device interface 54. The intelligent I/O expander 50 will receive and convert or reformat the message for the messaging interface 53. The intelligent I/O expander 50 will send the I/O expander ID and message through the messaging interface 53 to the private bus 55. The vehicular telemetry hardware system 30 receives the message from the messaging interface 53 with the I/O expander ID and message. The vehicular telemetry hardware system 30 may either log the data from the received message, or it may communicate the received message or data to a remote site (server 19) for further processing.

When the microprocessor 51 and firmware computer program convert or reformat messages, it may take several messages and reformatting of the messages. For example, in an embodiment of the invention, messages received over the private bus 55 have a data limitation of up to eight bytes. It may take several messages over the private bus 55 in order to receive the required data for sending to a specific device 60. In this case, messages received over the private bus 55 may be buffered in memory 52. Then, the data buffered in memory 52 may be reformatted to create a message for sending over the multi-device bus 56. Alternatively, messages received over the multi-device bus 56 may be buffered in memory 52 and subsequently reformatted to create a message, or multiple messages for sending over the private bus 55. The firmware computer program contains the instructions and logic for converting and reformatting messages between the two busses. Alternatively, several messages containing partial information may be sent directly if system speed permits sending partial information sequentially.

Figure 10:
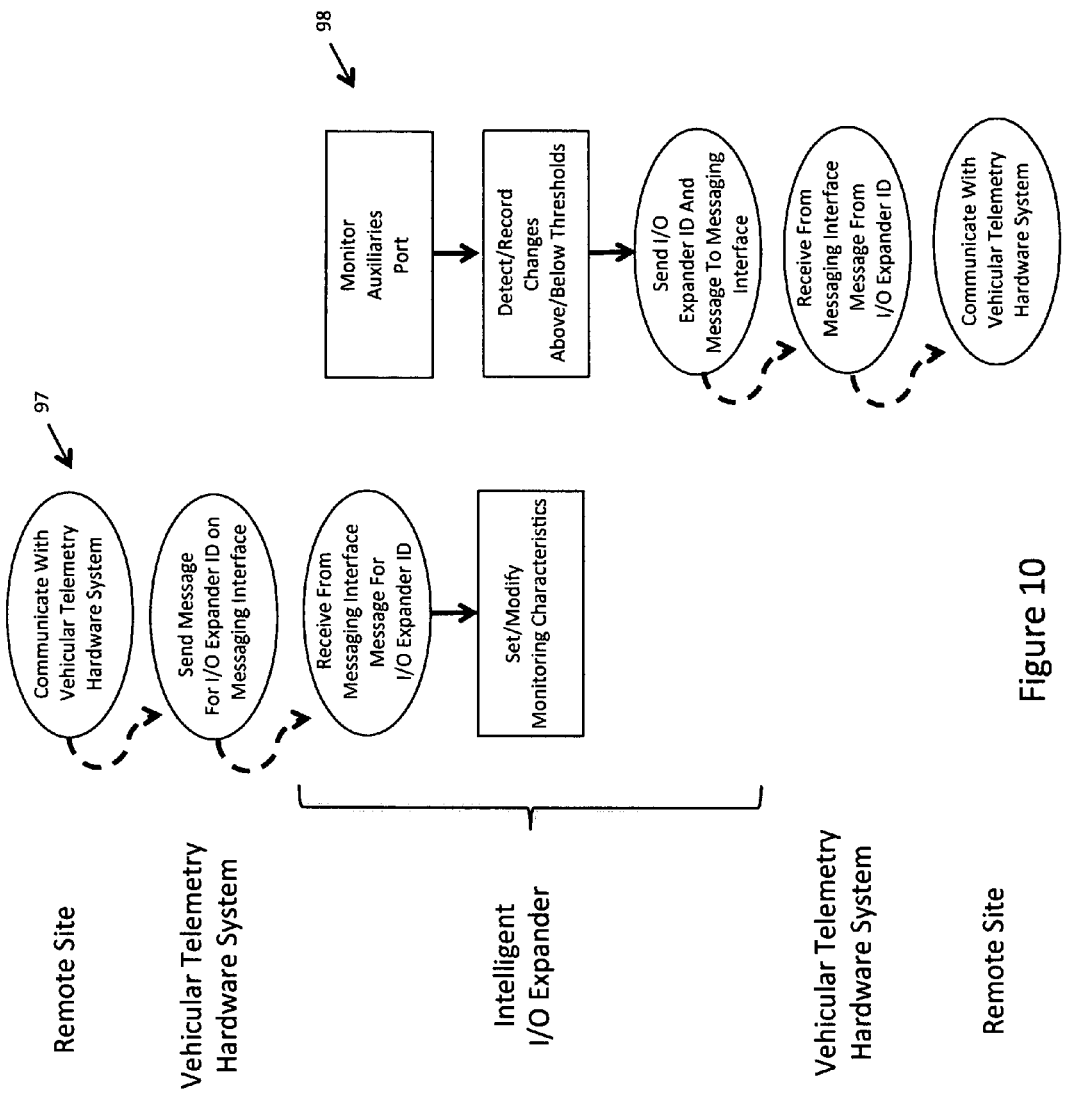
FIG. 10 is a high level flow chart for communication within the system for the case of an I/O expander configured as an auxiliaries port type and active expander mode.

Operation for the case of an auxiliaries port type is now described with reference to FIG. 10. Communicating with an intelligent I/O expander 50 is generally indicated at 97. Communication may either begin at a remote site (server 19) where a message is sent to the vehicular telemetry hardware system 30, which in turn is received by the vehicular telemetry hardware system 30, or a message may be generated by the vehicular telemetry hardware system 30. The vehicular telemetry hardware system 30 may send a message to an I/O expander with an I/O expander ID and message on the messaging interface 53. The intelligent I/O expander will receive the message (ID's match) and set or modify monitoring characteristics for the associated auxiliaries. If there are two intelligent I/O expanders 50 configured as auxiliaries, one expander would be AUX 1-4 and the other would be AUX 5-8.

Communication from the intelligent I/O expander 50 is generally indicated at 98. The intelligent I/O expander 50 monitors the auxiliaries through the configurable multi-device interface 54 based upon the monitoring characteristics. When changes are detected, or above a threshold, or below a threshold, the data is recorded in memory 52 of the intelligent I/O expander 50. The recorded data may be analog data, digital data, or both analog and digital data. The intelligent I/O expander may formulate a message and send the I/O expander ID and message to the messaging interface 53. The vehicular telemetry hardware system 30 receives the message (ID's match) over the messaging interface 53 and logs the data contained in the message into flash memory 35. Data from auxiliaries may be logged as analog, digital, or both analog and digital values. The vehicular telemetry hardware system 30 may also communicate the data to a remote site (server 19).

Figure 11:
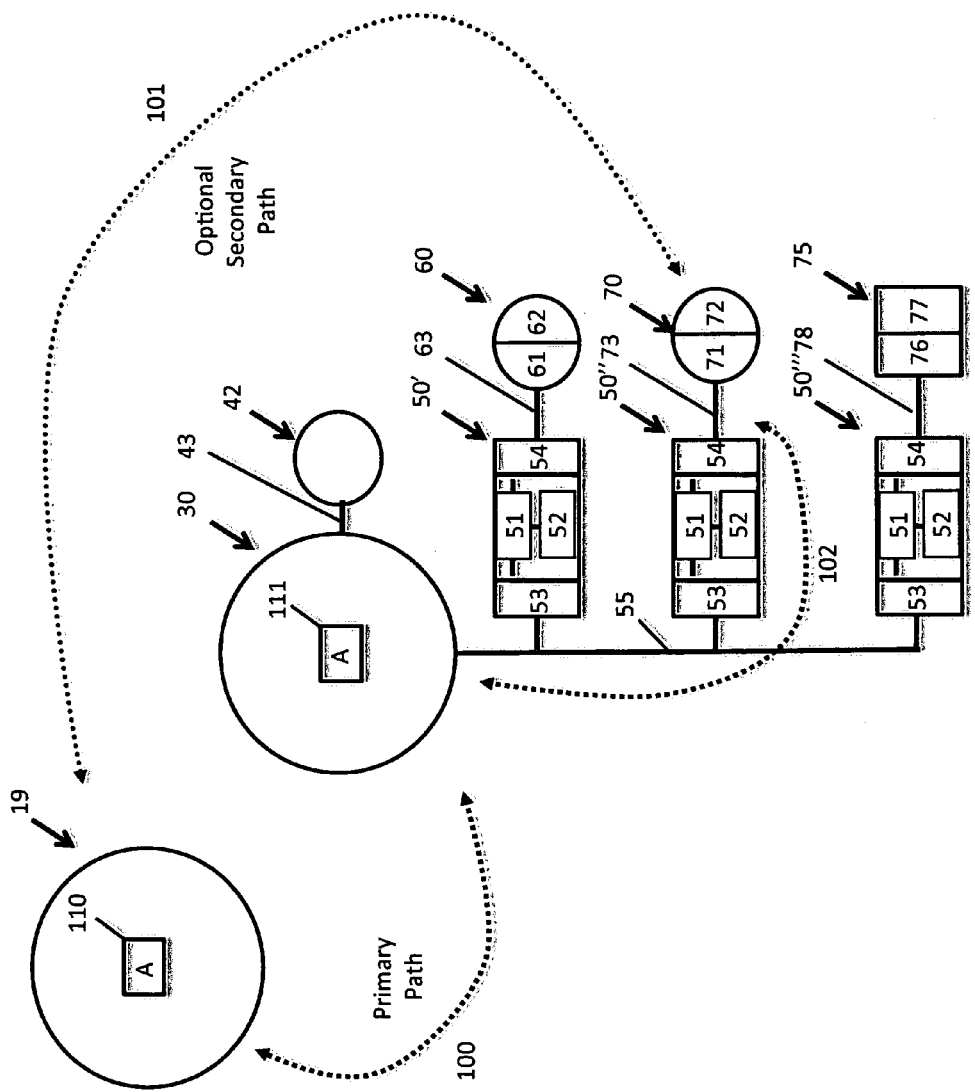
FIG. 11 is a diagrammatic view of message communication over a communications network between a server, vehicular telemetry hardware system, and an intelligent I/O expander configured as a serial port type, passive expander mode with a vehicular telemetry hardware system active serial control mode.

Operation of the overall system will be explained with an example as illustrated in FIG. 11 where there are three intelligent I/O expanders connected to the private bus 55 and the vehicular telemetry hardware system 30. The intelligent I/O expanders include a Garmin™ device 60, (Garmin™ interface 61 and type of device 62) an Iridium™ device 70, (Iridium™ interface 71 and type of device 72), and additional vehicle sensors 75 as AUX 1-4 (77) and AUX interface 76. In addition, there is a GeoTab™ intelligent configuring cable 73 between the multi-device interface 54 (50') and Garmin™ interface 61 cable 63, a GeoTab™ intelligent configuring cable 73 between the multi-device interface 54 (50") and Iridium™ interface 71, and a GeoTab™ intelligent configuring cable 73 between multi-device interface 54 (50''') and auxiliaries interface 76. The additional vehicle sensors in this example include drivers side door (open/close), passengers side door (open/close), and cargo door (open/close) (AUX 1, 2, and 3) (AUX 4 is not used).

Under normal operation, the vehicular telemetry hardware system 30 and DCE wireless telemetry communications microprocessor 32 communicate messages over the cellular network 17. This is referred to as the primary path 100.

If the message 111 originates with the vehicular telemetry hardware system 30, the message 111 would be sent over the cellular network 17, or primary path 100 and received by the server 19 as the message 110. If the message 110 originates with the server 19, the message 110 would be sent over the cellular network 19, or primary path 100 and received by the vehicular telemetry hardware system 30 as message 111.

If for some reason the cellular network 17 is unavailable, then the vehicular telemetry hardware system 30 and DTE telemetry microprocessor 31 may continue to communicate over the satellite network 13 (assuming and intelligent I/O expander 50 and Iridium™ like satellite communications device). This is referred to as a secondary path 101 and 102. In this case, an intelligent I/O expander 50" is interfaced to the vehicular telemetry hardware system 30 and initialized and configured as a serial type in an passive expander mode and the vehicular telemetry hardware system 30 is initialized in an active control mode with the instructions and logic for control and operation of the serial device (Iridium™ device 70).

If the message 111 originates with the vehicular telemetry hardware system 30, the message 111 would be sent over the private bus 55 to an intelligent I/O expander 50" with the Iridium™ device 70. The message would be converted or reformatted by the intelligent I/O expander 50 and sent to the Iridium™ device 70 over the multi-device bus 56 and cable 73. The Iridium™ device 70 would then provide satellite communications 12 and the server 19 would receive the message as 110.

Additionally, a message 110 could be sent by the server 19 and received by the Iridium™ device 70 and provided to the intelligent I/O expander 50" through the multi-device bus 56 and cable 73. The intelligent I/O expander 50" would send a converted or reformatted message to the vehicular telemetry hardware system 30 over the private bus 55 and the message would be received as 111.

Figure 12:
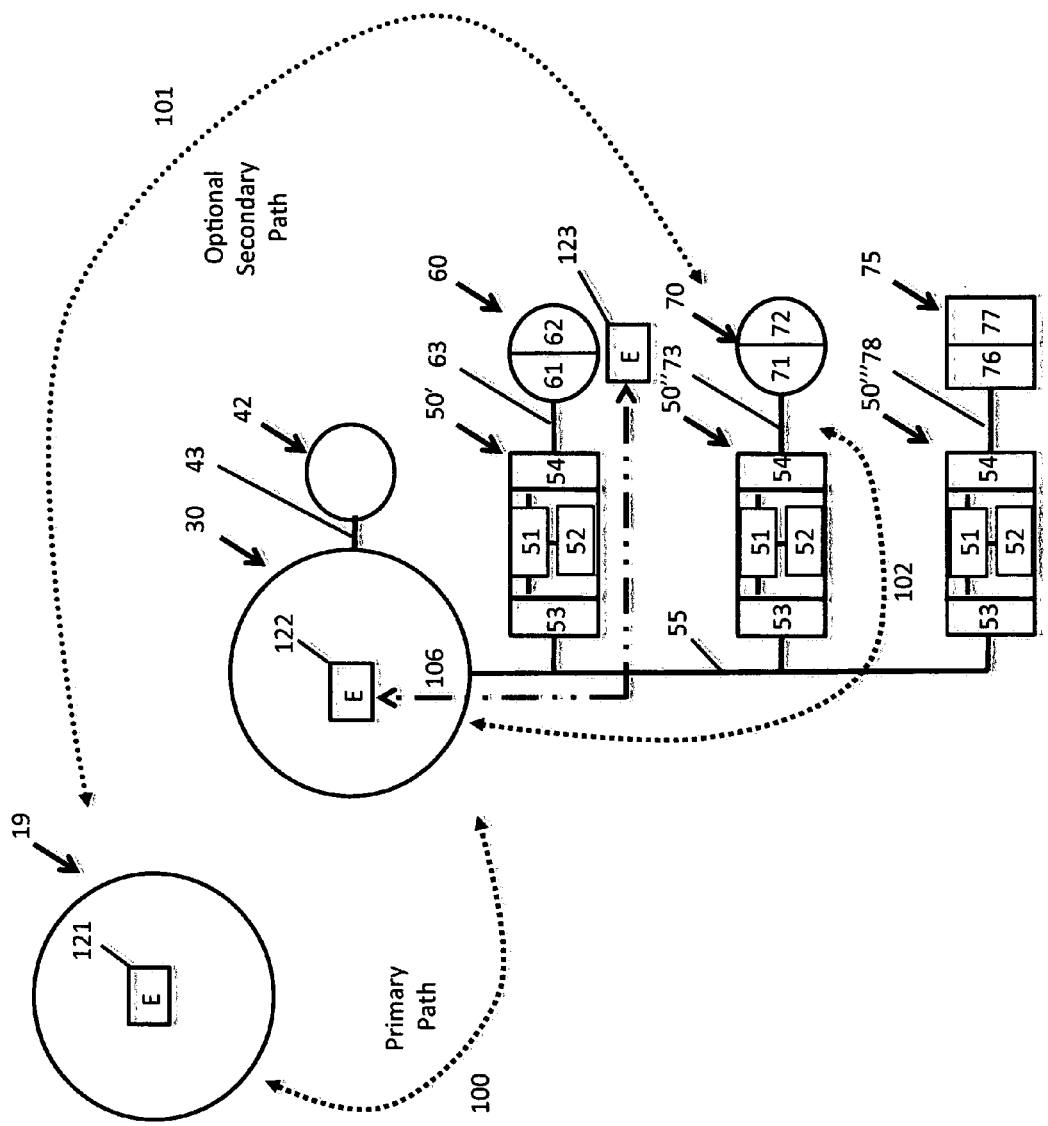
FIG. 12 is a diagrammatic view of message communication over a communications network between a server, vehicular telemetry hardware system and an intelligent I/O expander configured as a serial type, passive expander mode with a vehicular telemetry hardware system passive serial control mode.

Referring now to FIG. 12, a further example of an embodiment of the invention is described. In this example, an intelligent I/O expander 50' is initialized and configured as a serial type in a passive expander mode and the vehicular telemetry hardware system 30 is configured in a passive control mode and may convert or reformat the message between the server 19 and the intelligent I/O expander 50'.

Starting with a message 121 in the server 19 to be sent to a Garmin™ device 60. The message 121 may be provided to the vehicular telemetry hardware system 30 by way of either the primary path 100 or the secondary path 101, 102 as previously described. The vehicular telemetry hardware system 30 receives the message as 122 and converts or reformats the message for sending the message over the private bus 55 to the intelligent I/O expander 50' identified with the Garmin™ device 60. The intelligent I/O expander 50 receives the message over the private interface 53 (50') and converts or reformats the message by the microprocessor 51 and memory 52. The message is then sent over the multi-device interface 54 (50'), GeoTab™ intelligent configuring cable 56 to the Garmin™ interface 61 where the Garmin™ device receives the message at 123.

Additionally, a message 123 could be provided to the server 19. The message 123 is provided by the Garmin™ device 60 to the Garmin™ interface 61, the GeoTabu™ intelligent configuring cable 56, and received by the intelligent I/O expander 50 through the multi-device interface 54 (50'). The intelligent I/O expander 50' converts or reformats the message and provides the message to the private interface 53 (50') and the private bus 55 to the vehicular telemetry hardware system 30. The vehicular telemetry hardware system 30 converts or reformats the message 122 and provides the message to the server 19 as 121 by way of the primary path 100 or the secondary path 101, 102.

Figure 13:
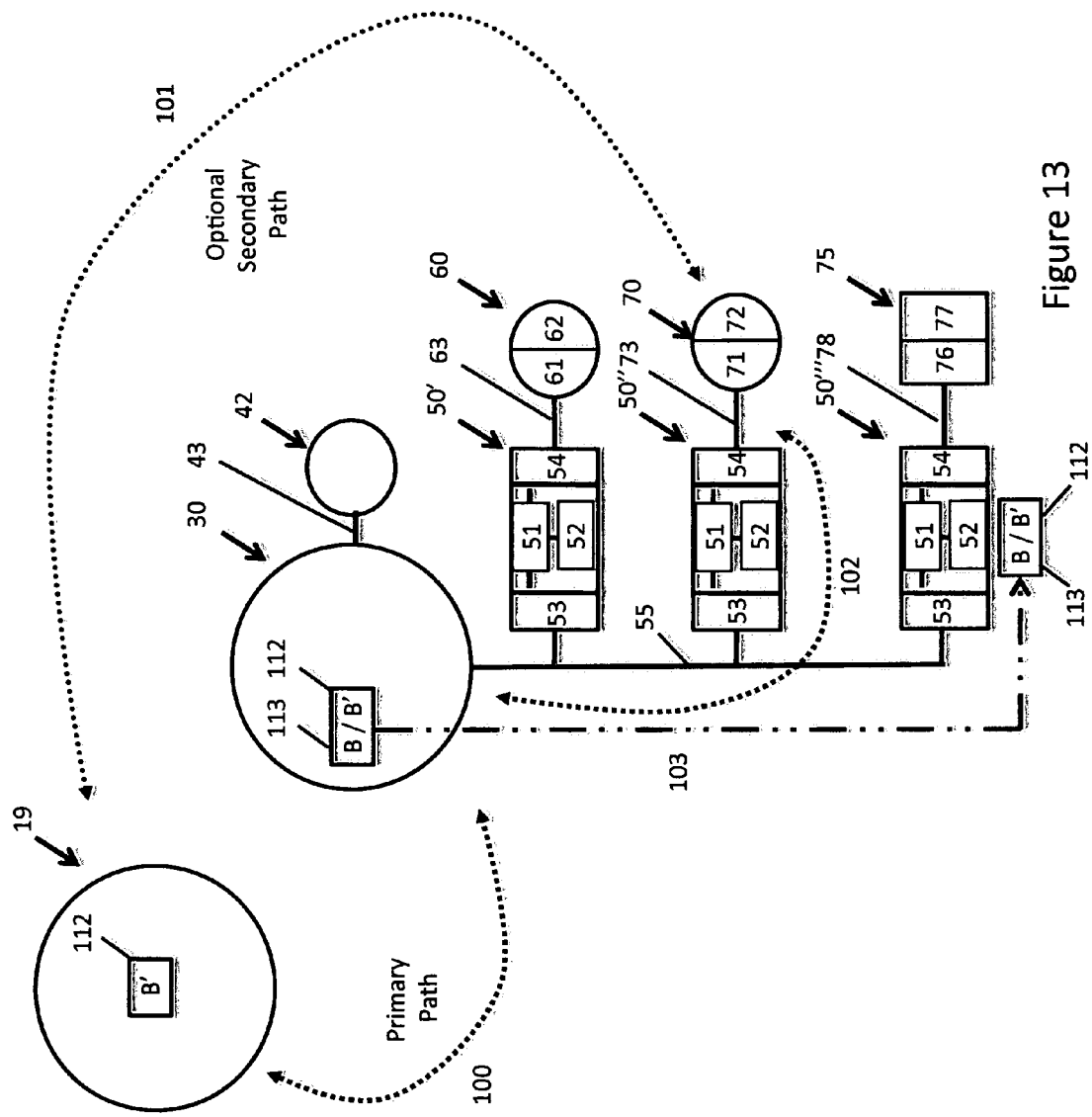
FIG. 13 is a diagrammatic view of message communication over a communications network between a server, vehicular telemetry hardware system, and an intelligent I/O expander configured as an auxiliaries type, active expander mode, and receiving monitoring characteristics.

Referring now to FIG. 13, a further example of an embodiment of the invention is described. In this example, an intelligent I/O expander 50''' is initialized and configured as an auxiliaries type in an active expander mode and interfaced by the GeoTab™ intelligent configuring cable 78 to the auxiliaries.

In a first embodiment of the invention, the vehicular telemetry hardware system 30 may have the monitoring characteristics for the intelligent I/O expander 50''' as a message 113. The message 113 is provided by the vehicular telemetry hardware system over the private bus 55 to the private interface 53 of the intelligent I/O expander 50''' as 113. The microprocessor 51 and memory 52 of the intelligent I/O expander 50''' establish monitoring of the auxiliaries based upon the monitoring characteristics in the message 113.

Additionally, the server 19 may provide the monitoring characteristics. A message 112 is provided to the vehicular telemetry hardware system 30 by way of the primary path 100 or the secondary path 101, 102. The vehicular telemetry hardware system 30 will convert or reformat the message 112 and provide the message to the intelligent I/O expander 50''' over the private bus 55 and private interface 53 of the expander 50'''. The microprocessor 51 and memory 52 of the intelligent I/O expander 50''' establish monitoring of the auxiliaries based upon the monitoring characteristics in the message 112.

Figure 14:
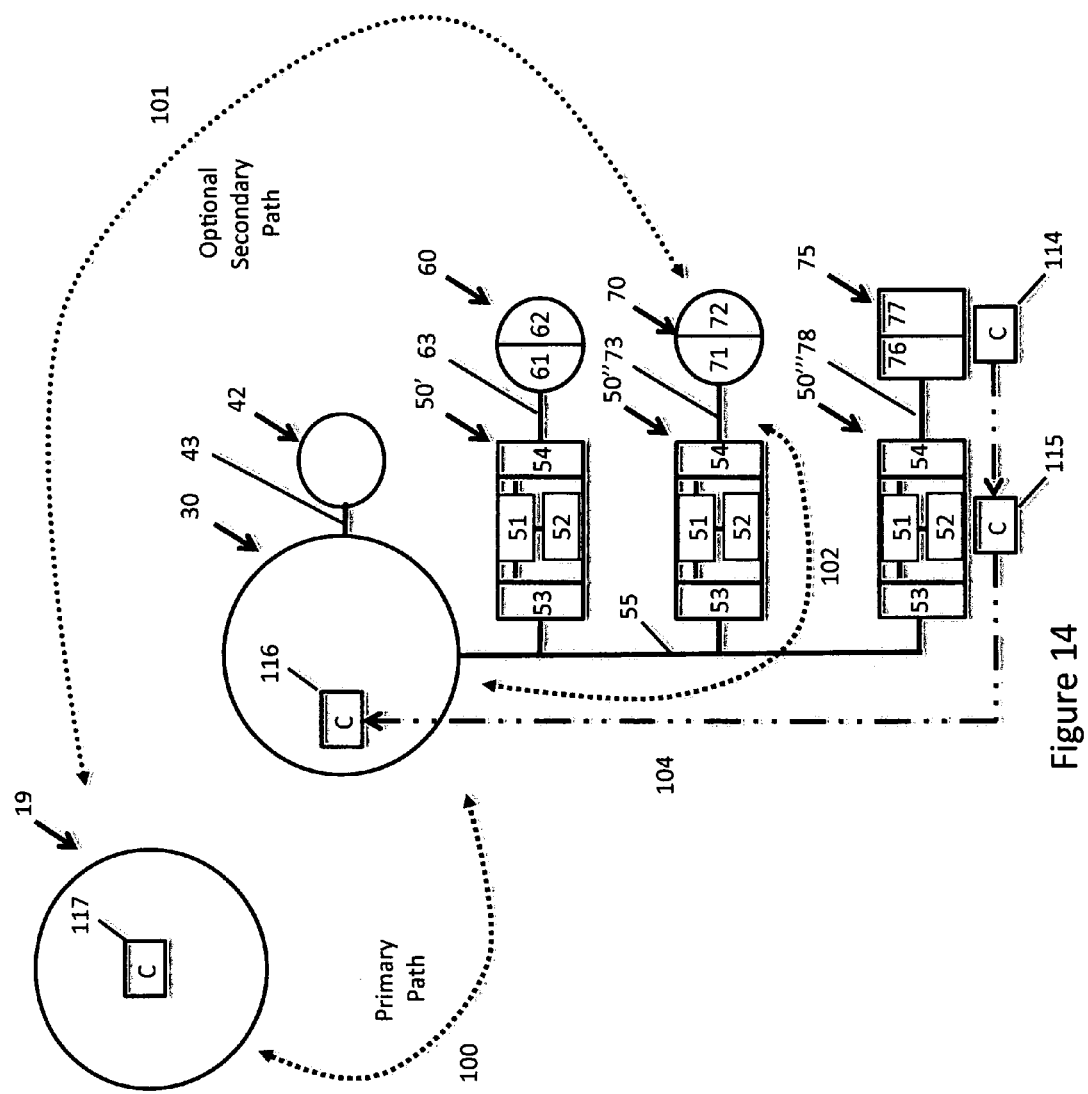
FIG. 14 is a diagrammatic view of message communication over a communications network between a server, vehicular telemetry hardware system, and an intelligent I/O expander configured as an auxiliaries type, active expander mode, sensing auxiliaries data.

Referring now to FIG. 14, a further example of an embodiment of the invention is described. In this example, an intelligent I/O expander 50''' is initialized and configured as an auxiliaries type in the active mode and interface by the GeoTab™ intelligent configuring cable 78 to the auxiliaries. Furthermore, the intelligent I/O expander 50''' has received the monitoring characteristics and is monitoring the auxiliaries.

Upon detecting a change or a threshold event, data 114 is captured by the intelligent I/O expander 50''' through the cable 78 and multi-device interface 54. The microprocessor 51 and memory 52 of the intelligent I/O expander 50''' create a message 115 containing the data 114. The message 115 is provided to the vehicular telemetry hardware system 30 by way of the private interface 53 of the intelligent I/O expander 50''' and the private bus 55.

The vehicular telemetry hardware system 30 converts or reformats the message 116 and logs the data. The vehicular telemetry hardware system 30 may further provide the data in a message to the server 19 by way of the primary path 100 or the secondary path 101, 102. Application software on the server 19 receives the message and associated data 114 for further analysis. The application software has an associated log to understand what types of auxiliaries are associated with AUX 1-4 as well as AUX 5-8. For example AUX 1 is door (open/close), AUX 2 is passengers side door (open/close), and AUX 3 is cargo door (Open/close).

Figure 15:
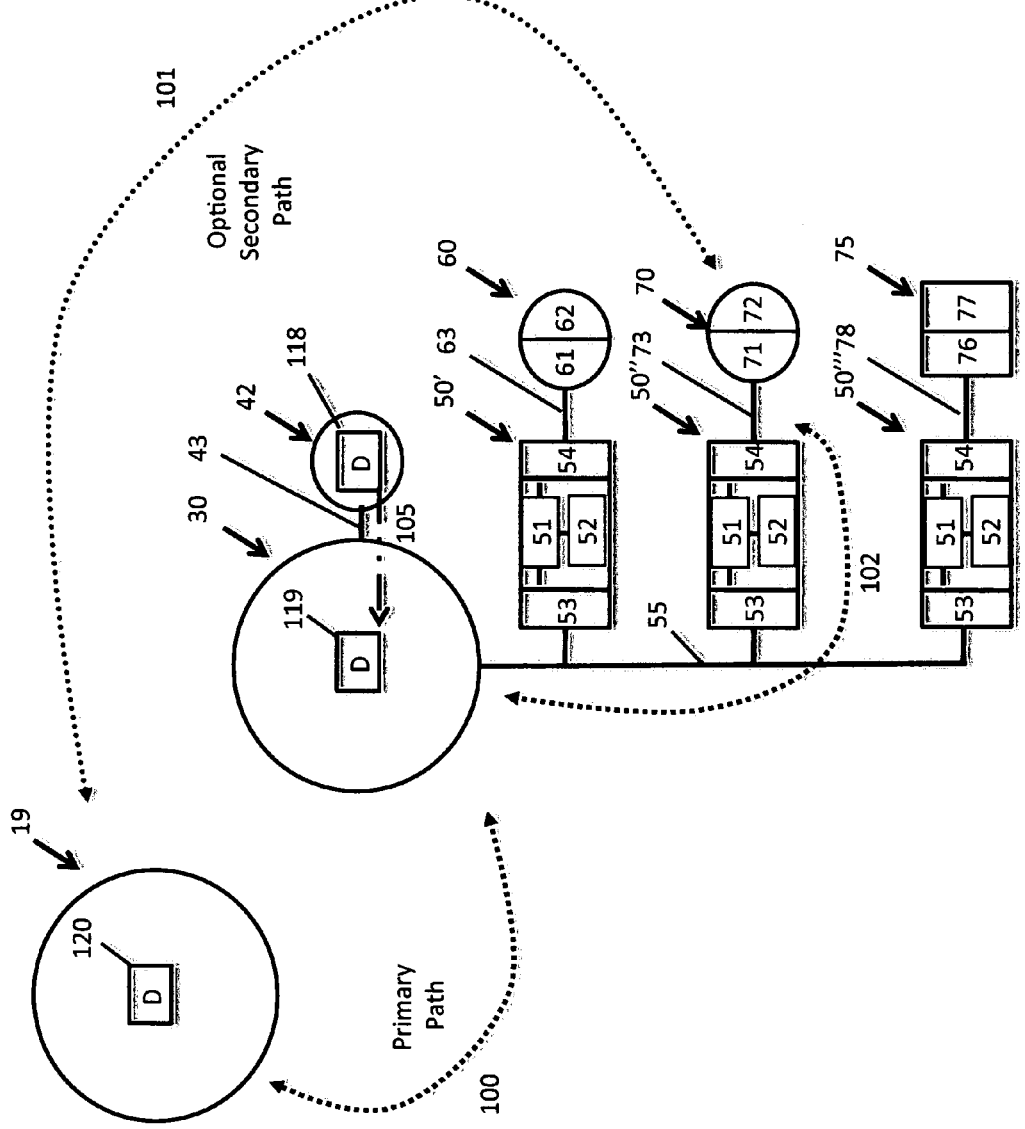
FIG. 15 is a diagrammatic view of message communication over a communications network between a server, vehicular telemetry hardware system, resident vehicular portion with vehicle data and information, and an intelligent I/O expander with satellite communications capability.

A final example is described with reference to FIG. 15. The vehicular telemetry hardware system 30 is monitoring the resident vehicular portion 42 over the vehicle connection 43. Data 118 may be logged by the vehicular telemetry hardware system 30. The vehicular telemetry hardware system 30 may provide the data 118 as a message 119 to the server 19 as message 120. The message 119 may be provided to the server by way of the primary path 100 or the secondary path 101, 102 (if an intelligent I/O expander with an Iridium™ like satellite communications device is present). The vehicular telemetry hardware system 30 may provide the data immediately to the server 19 by way of the Iridium™ device upon detecting a significant event such as an accident.

Embodiments of the present invention provide one or more technical effects. Intelligent expansion of a vehicular telemetry hardware system. Protocol conversion, converting or reformatting of messages between a private bus and a multi-device bus. Configurable intelligent I/O expanders 50 as either a serial type or an auxiliaries type. Intelligent I/O expanders configurable to either a passive expander mode or an active expander mode. A vehicular telemetry hardware system configurable in part for an active control mode or a passive control mode. Logical recognition of auxiliary conductors as either AUX 1-4 or AUX 5-8. Monitoring and data logging of auxiliaries. Parallel processing of auxiliaries connected to an intelligent I/O expander reducing the workload of the vehicular telemetry hardware system microprocessor. Distributed control logic and machine instructions between a server, a vehicular telemetry hardware system, and intelligent I/O expander.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. A method of initializing an intelligent I/O expander and a vehicular telemetry hardware system, the method comprising:
   determine I/O expander port type,
   if serial, set serial type and passive expander mode,
   if auxiliaries, set auxiliaries type and active expander mode,
   communicate said I/O expander port type to said vehicular telemetry hardware system,
   if serial, communicate with said intelligent I/O expander and receive a device type,
   if said device type is a first device type, set said vehicular telemetry hardware system to active serial control mode,
   if said device type is a second device type, set said vehicular telemetry hardware system to passive serial control mode, if auxiliaries, communicate monitoring characteristics to said intelligent I/O expander.

2. A method of initializing an intelligent I/O expander and a vehicular telemetry hardware system as in claim 1 wherein said determine I/O expander port type includes sensing a configurable multi-device interface.

3. A method of initializing an intelligent I/O expander and a vehicular telemetry hardware system as in claim 2 wherein said sensing a configurable multi-device interface includes sensing a pin configuration of said configurable multi-device interface to determine said I/O expander port type.

4. A method of initializing an intelligent I/O expander and a vehicular telemetry hardware system as in claim 2 wherein said sensing a configurable multi-device interface includes sensing a configuration of a cable communicating with said configurable multi-device interface.

5. A method of initializing an intelligent I/O expander and a vehicular telemetry hardware system as in claim 4 wherein said sensing a configurable multi-device interface includes sensing a pin configuration of said cable communicating with said configurable multi-device interface.

6. A method of initializing an intelligent I/O expander and a vehicular telemetry hardware system as in claim 1 wherein said passive expander mode enables at least one of message conversion, message reformatting, or protocol conversion.

7. A method of initializing an intelligent I/O expander and a vehicular telemetry hardware system as in claim 1 wherein said active expander mode enables a capability to monitor a configurable multi-device interface.

8. A method of initializing an intelligent I/O expander and a vehicular telemetry hardware system as in claim 7 wherein said capability to monitor is based upon said monitoring characteristics.

9. A method of initializing an intelligent I/O expander and a vehicular telemetry hardware system as in claim 1 wherein initializing enables said vehicular telemetry hardware system and said first device type to cooperate.

10. A method of initializing an intelligent I/O expander and a vehicular telemetry hardware system as in claim 1 wherein initializing enables said vehicular telemetry hardware system and said first device type for communication.

11. A method of initializing an intelligent I/O expander and a vehicular telemetry hardware system as in claim 1 wherein initializing enables a remote system and said second device type to cooperate.

12. A method of initializing an intelligent I/O expander and a vehicular telemetry hardware system as in claim 1 wherein initializing enables a remote system and said second device type for communication.

13. A method of initializing an intelligent I/O expander and a vehicular telemetry hardware system as in claim 1 wherein said active serial control mode enables communication between said vehicular telemetry hardware system and said first device type.

14. A method of initializing an intelligent I/O expander and a vehicular telemetry hardware system as in claim 13 wherein said first device type is a communications device.

15. A method of initializing an intelligent I/O expander and a vehicular telemetry hardware system as in claim 1 wherein said passive serial control mode enables communication between a remote system and said second device type.

16. A method of initializing an intelligent I/O expander and a vehicular telemetry hardware system as in claim 15 wherein said second device type is a GPS device.

17. A method of initializing an intelligent I/O expander and a vehicular telemetry hardware system as in claim 1 wherein said auxiliaries type includes said monitoring characteristics associated with at least one auxiliary device.

18. A method of initializing an intelligent I/O expander and a vehicular telemetry hardware system as in claim 1 wherein said auxiliaries type includes a capability for at least one group of four auxiliaries associated with said monitoring characteristics.

19. A method of initializing an intelligent I/O expander and a vehicular telemetry hardware system as in claim 1 wherein said monitoring characteristics includes at least one of threshold, limit, change in value or range in value.

20. A method of initializing an intelligent I/O expander and a vehicular telemetry hardware system as in claim 1 wherein said monitoring characteristics may be re-initialized or modified during operation of said intelligent I/O expander.

* * * * *